United States Patent
Oda (10) Patent No.: US 7,508,795 B2
(45) Date of Patent: Mar. 24, 2009

(54) DATA PROCESSING UNIT, DATA PROCESSING METHOD AND DATA PROCESSING SYSTEM

(75) Inventor: Toshiyuki Oda, Tokyo (JP)

(73) Assignee: NEC Corporation, Tokyo (JP)

( * ) Notice: Subject to any disclaimer, the term of this patent is extended or adjusted under 35 U.S.C. 154(b) by 631 days.

(21) Appl. No.: 11/222,982

(22) Filed: Sep. 12, 2005

(65) Prior Publication Data

US 2006/0079209 A1    Apr. 13, 2006

(30) Foreign Application Priority Data

Sep. 14, 2004   (JP)   ............................. 2004-267122

(51) Int. Cl.
*H04Q 7/00*   (2006.01)

(52) U.S. Cl. ................. 370/332; 370/331; 370/350; 370/324; 370/328; 370/252; 455/525; 455/502

(58) Field of Classification Search ......... 455/436–444, 455/502, 524–525, 67.11, 67.13, 550.1, 552.1, 455/560–561; 370/310, 328, 331–332, 347–350, 370/324, 252
See application file for complete search history.

(56) References Cited

U.S. PATENT DOCUMENTS

| | | | |
|---|---|---|---|
| 6,785,545 B1* | 8/2004 | Murakami et al. | 455/441 |
| 7,016,310 B2* | 3/2006 | Rune et al. | 370/252 |
| 7,072,698 B2* | 7/2006 | Underbrink et al. | 455/575.5 |
| 7,363,041 B2* | 4/2008 | Bonnard et al. | 455/456.1 |
| 2002/0061731 A1* | 5/2002 | Takano et al. | 455/67.1 |
| 2003/0012176 A1* | 1/2003 | Kondylis et al. | 370/348 |
| 2004/0267983 A1* | 12/2004 | Oda | 710/56 |
| 2007/0232290 A1* | 10/2007 | Tetman et al. | 455/423 |

FOREIGN PATENT DOCUMENTS

| | | |
|---|---|---|
| JP | 06-335050 | 12/1994 |
| JP | 08-125746 | 5/1996 |
| JP | 2001-177549 A | 6/2001 |
| JP | 2002-094437 A | 3/2002 |

* cited by examiner

*Primary Examiner*—Kamran Afshar
(74) *Attorney, Agent, or Firm*—Foley & Lardner LLP (57) ABSTRACT

During operation a check is made, by utilizing a tuning function of tuning communication parameters, if communication parameters used for wireless communication with another movable unit are suitable. When the communication parameters are found to be unsuitable, new communication parameters are used for communication. Thus, the communication performance of the movable unit is improved to significantly reduce the steps to select the optimum communication parameters and permits the communication parameter selection while confirming the reliability of each communication parameter.

33 Claims, 7 Drawing Sheets

DATA PROCESSING UNIT, DATA PROCESSING METHOD AND DATA PROCESSING SYSTEM

BACKGROUND OF THE INVENTION

This application claims benefit of Japanese Patent Application No. 2004-267122 filed on Sep. 14, 2004, the contents of which are incorporated by the reference.

The present invention relates to data processing unit, data processing method and data processing system and, more particularly, to data processing unit, data processing method and data processing system, in which optimum communication parameters are set up by a tuning function for wireless communication with other units with communication parameters suited for the radio wave environment.

Communication between a portable telephone set (hereinafter referred to as a movable unit) and a base station is made by utilizing parameters concerning reception characteristics of the movable unit (hereinafter referred to as communication parameters). A W-CDMA (Wideband Code Division Multiple Access) system is an example of communication executed on the basis of communication parameters. The W-CDMA system is a wideband version of the CDMA (Code Division Multiple Access) system for enabling to cope with multiple media. According to this system, the movable unit is able to realize high quality communication even in any environment by using optimum communication parameters for communication. The CDMA technique utilizes the spectrum dispersion technique to permit a plurality of communications at a time by using signals in the same frequency band.

Literature 1 (Japanese Patent Laid-open No. 2001-177549A) proposes an inter-unit communication parameter changing system, which is used for transfer network system and permits, in the case when a unit changes data stored therein for inter-unit communication, changing data in all the units provided on the network by causing input of changed data to all the units on the network while separately storing the changed data.

Literature 2 (Japanese Patent Laid-open No. 2002-94437A) proposes communication unit and method, data processing unit and method and recording medium, which permit execution of a receiving process based on reception characteristic parameters suited for radio wave environment by obtaining and storing the reception characteristic parameters suited for the radio wave environment and executing the receiving process for receiving radio wave according to the stored reception characteristic parameters.

Literature 3 (Japanese Patent Laid-open No. Hei06-335050A) proposes a mobile communication system, in which between the control station and each of a plurality of base stations, a bi-directional signal transfer means and a deciding means for deciding that a mobile station has moved out of a zone are provided, thereby permitting the changing of the base station for communication with the mobile station with the sole process in the base station and without execution of any place in the control station or the mobile station.

Literature 4 (Japanese Patent Laid-open No. Hei08-125746A) is aimed to provide a communication system, which provides for communication environment optimization and permits to select the optimum communication environment according to the environments of the transmitting and receiving sides.

However, the above prior art inventions have the following problem.

In the prior art data processing unit, depending on the zone the communication parameters of the network on which wirelessly communicate with other units can not be sufficiently tuned. Consequently, the communication parameters of the network are set to values permitting the minimum communication under any environment. Therefore, in the case where the installation conditions and working environment of a movable unit contains many obstacles such as interference with respect to radio waves, the communication performance of the movable unit can not be improved.

SUMMARY OF THE INVENTION

The present invention, accordingly, has an object of providing a data processing unit, a data processing method and a data processing system, which are improved in communication performance in that a tuning function for tuning communication parameters during operation is provided for checking out if the communication parameters used for wireless communication with any other unit are suitable, and that in case of inadequacy of the checked out communication parameters, new communication parameters are used for communication in order to improve communication performance.

One aspect of the present invention is a data processing unit for wirelessly communicating with a plurality of data processing units, comprising:

transmitting means for transmitting data according to communication parameters;

receiving means for receiving the data according to the communication parameters;

checking means for check out, according to the data, if the communication parameters are suited for the radio wave environment; and control means for setting communication parameters suited to the radio wave environment.

The data processing unit further comprises:

storing means for storing the data received by the receiving means, the checking means checking out, when a predetermined quantity of data has been stored in the storing means or when data in a predetermined period has been stored in the storing means, if communication parameters suitable for the radio wave environment have been set.

In the data processing unit, the checking means checks out, when the data processing unit is in a waiting state and according to the result cell selection for the best radio wave reception, if communication parameters suitable for the radio wave environment have been set.

In the data processing unit, one of the communication parameters is a monitoring time until the radio wave is switched to the optimum wave by the cell reselection.

In the data processing unit, the checking means checks out, while the data processing unit is in communication and according to the result of the hand-over for the optimum radio wave selection, if communication parameters suitable for the radio wave environment have been set.

In the data processing unit, one of the communication parameters is the difference between the qualities of radio waves compared in the hand-over.

In the data processing unit, the checking means checks out, when the communication of the data processing unit is discontinued or power source of he data processing unit is turned on and according to the result of a band search for the optimum radio wave detection, if communication parameters suitable for the radio wave environment have been set.

In the data processing unit, one of the communication parameters is a waiting time from a momentary discontinuation of the communication by the band search till the detection of the optimum radio wave.

In the data processing unit, wherein the checking means checks out, according to the result of a circular redundancy check of the data, if communication parameters suitable for the radio wave environment have been set.

In the data processing unit, the checking means checks out, according to the ratio between the signal component and noise component in the data, if communication parameters suitable for the radio wave environment have been set.

In the data processing unit, the checking means checks out, according to the reception level of signal synchronized with the data reception, if communication parameters suitable for the radio wave environment have been set.

In the data processing unit, the checking means checks out, according to the speed of movement of the communication unit with which the communication is being made, if communication parameters suitable for the radio wave environment have been set.

Another aspect of the present invention is a data processing method for wirelessly communicating with a plurality of data processing units, comprising the steps of:

transmitting data according to communication parameters;

receiving the data according to the communication parameters;

checking out, according to the data, if the communication parameters are suitable for the radio wave environment; and controlling to set the communication parameters most suitable for the radio wave environment based on the result of the checking.

The data processing method further comprises the step of storing the data received in the receiving step, and the checking step checking out if the communication parameters are suitably set to the radio wave environment when the data stored in the storage step is reached a predetermined value or data for a predetermined period is stored in the storage step.

In the data processing method, the checking step checks out, when the data processing unit is in a waiting state and according to the result cell selection for the suitable radio wave reception, if communication parameters suitable for the radio wave environment have been set.

In the data processing method, one of the communication parameters is a monitoring time until the radio wave is switched to the optimum wave by the cell reselection.

In the data processing method, the checking step checks out, while the data processing unit is in communication and according to the result of the hand-over for the optimum radio wave selection, if communication parameters suitable for the radio wave environment have been set.

In the data processing method, one of the communication parameters is the difference between the qualities of radio waves-compared in the hand-over.

In the data processing method, the checking step checks out, when the communication of the data processing unit is discontinued or power source of he data processing unit is turned on and according to the result of a band search for the optimum radio wave detection, if communication parameters suitable for the radio wave environment have been set.

In the data processing method, one of the communication parameters is a waiting time from a momentary discontinuation of the communication by the band search till the detection of the optimum radio wave.

In the data processing method, the checking step checks out, according to the result of a circular redundancy check of the data, if communication parameters suitable for the radio wave environment have been set.

In the data processing method, the checking step checks out, according to the ratio between the signal component and noise component in the data, if communication parameters suitable for the radio wave environment have been set.

In the data processing method, the checking means checks out, according to the reception level of signal synchronized with the data reception, if communication parameters suitable for the radio wave environment have been set.

In the data processing method, the checking step checks out, according to the speed of movement of the communication unit with which the communication is being made, if communication parameters suitable for the radio wave environment have been set.

A still other aspect of the present invention is a data processing system for wirelessly communicating with a plurality of data processing units, wherein the data processing unit comprises:

transmitting means for transmitting data based on communication parameters;

receiving means for receiving the data according to the communication parameters;

checking means for check out, according to the data, if the communication parameters are suitable for the radio wave environment; and control means for setting communication parameters suitable for the radio wave environment.

In the data processing system, the data processing unit further comprises:

storing means for storing the data received by the receiving means, and the checking means checking out, when a predetermined quantity of data has been stored in the storing means or when data in a predetermined period has been stored in the storing means, if communication parameters suitable for the radio wave environment have been set.

In the data processing system, the checking means checks out, when the data processing unit is in a waiting state and according to the result cell selection for the optimum radio wave reception, if communication parameters suitable for the radio wave environment have been set.

In the data processing system, one of the communication parameters is a monitoring time until the radio wave is switched to the optimum wave by the cell reselection.

In the data processing system, the checking means checks out, while the data processing unit is in communication and according to the result of the hand-over for the optimum radio wave selection, if communication parameters suitable for the radio wave environment have been set.

In the data processing system, one of the communication parameters is the difference between the qualities of radio waves compared in the hand-over.

In the data processing system, the checking means checks out, when the communication of the data processing unit is discontinued or power source of he data processing unit is turned on and according to the result of a band search for the optimum radio wave detection, if communication parameters suitable for the radio wave environment have been set.

In the data processing system, one of the communication parameters is a waiting time from a momentary discontinuation of the communication by the band search till the detection of the optimum radio wave.

In the data processing system, the checking means checks out, according to the result of a circular redundancy check of the data, if communication parameters suitable for the radio wave environment have been set.

In the data processing system, the checking means checks out, according to the ratio between the signal component and noise component in the data, if communication parameters suitable for the radio wave environment have been set.

In the data processing system, the checking means checks out, according to the reception level of signal synchronized with the data reception, if communication parameters suitable for the radio wave environment have been set.

In the data processing system, the checking means checks out, according to the speed of movement of the communication unit with which the communication is being made, if communication parameters suitable for the radio wave environment have been set.

According to the present invention, the communication performance is improved in that a tuning function is provided for checking out if the communication parameters used for wireless communication with any other unit are suitable, and that in the case of inadequacy of the checked out communication parameters, communication is made with new communication parameters. Thus, it is possible to greatly reduce the steps for selecting the suitable communication parameters. Besides, the communication parameter selection is made while confirming the reliability of each communication parameter. Thus, it is possible to prevent variations of the communication parameters due to transient fading or the like and also cope with the communication parameter variations due to installation of a new base station or construction or destruction of any building.

In this embodiment, a tuning function of tuning communication parameters during operation is utilized to check out if communication parameters used for wireless communication with any other unit are suitable and use new communication parameters if the checked out communication parameters are not suitable. In this way, the communication performance is improved to significantly reduce the steps for selecting the suitable communication parameters and enable to select communication parameters while confirming the reliability of the communication parameters.

PREFERRED EMBODIMENTS OF THE INVENTION

Now, preferable embodiments of the present invention will be described.

Figure 1A:
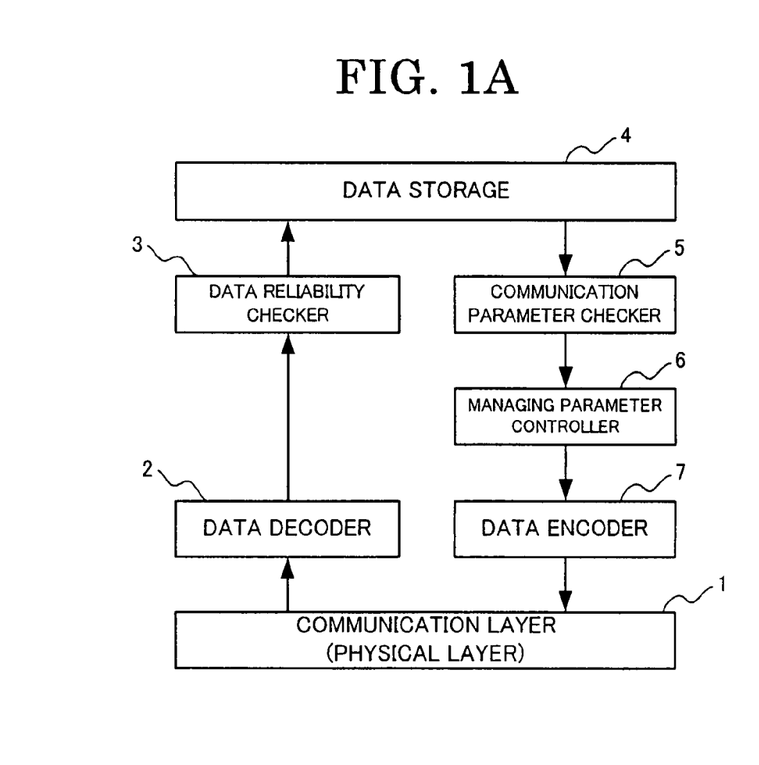
FIGS. 1(a) and 1(b) are block diagrams showing the system construction of embodiments of the data processing unit according to the present invention.

FIG. 1(a) is a block diagram showing the system construction of an embodiment of the data processing unit according to the present invention. The data processing unit shown in FIG. 1(a) comprises a communication layer 1, a data decoder 2, a data reliability checker 3, a data storage 4, a communication parameter checker 5, a managing parameter controller 6 and a data encoder 7. The communication layer 1 transmits and receives radio wave to and from other units. The data decoder 2 receives data from the communication layer 1 with communication parameters given by the managing parameter controller 6, and decodes the received data. The data reliability checker 3 considers any data received in the same time zone from the same movable unit to be duplicated data, and only single piece of data is stored in the data storage 4. The data storage 4 stores data from the data reliability checker 3. The communication parameter checker 5 collects at least one of received data error factor of data stored in the data storage 4, received signal quality, common channel receiving level, speed of movement of the other communication unit to communicate with, data of success/failure cell re-selection, data of success/failure of hand-over and data of success/failure of band search for every predetermined quantity or in every predetermined period, and checks out if it uses suitable communication parameters suitable for data communication. The received data error factor is the result of a circular redundancy check (CRC). The received signal quality is a signal-to-noise ratio (SNR). The common channel receiving level is the receiving level of a sync signal for matching the operation timings of transmitting and receiving signals when data is transmitted and received between communication units. The managing parameter controller 6 determines suitable communication parameters based on the check result of the communication parameter checker 5, buries the determined communication parameters in data, and outputs the result to the data encoder 7. The data encoder 7 encodes the data containing the communication parameters buried therein, and outputs the coded data to the communication layer 1.

Figure 1B:
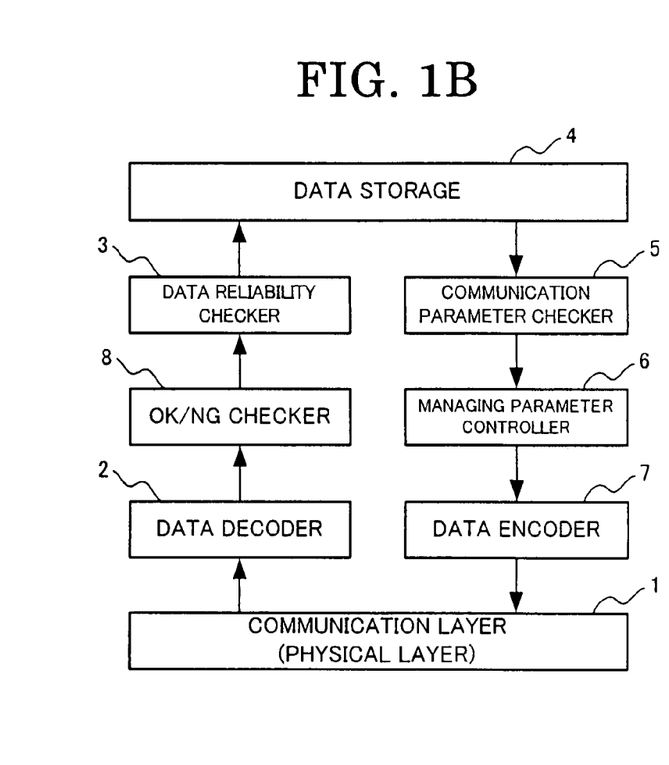

As shown in FIG. 1(b), the embodiment of the data processing unit can further comprise an OK/NG checker 8 for checking out the OK/NG of each communication process.

Figure 2A:
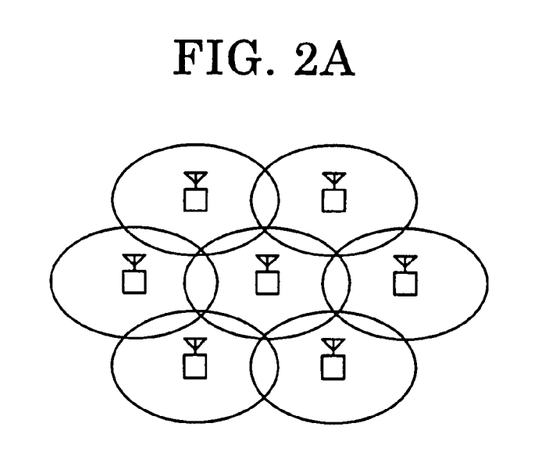
FIGS. 2(a) to 2(c) are illustrations of examples of the cell arrangement, FIG. 2(a) showing an example of the cell arrangement in a rural area, FIG. 2(b) showing an example of the cell arrangement in an urban area, and FIG. 2(c) showing an example of the cell arrangement in an area along a railway or a trunk road.
Figure 2B:
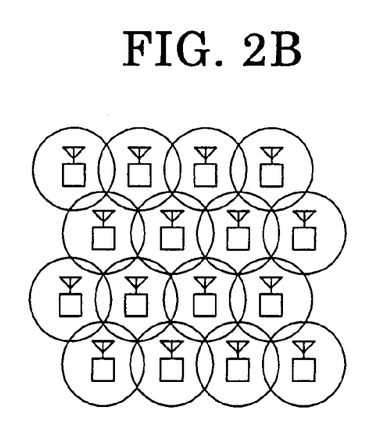
Figure 2C:
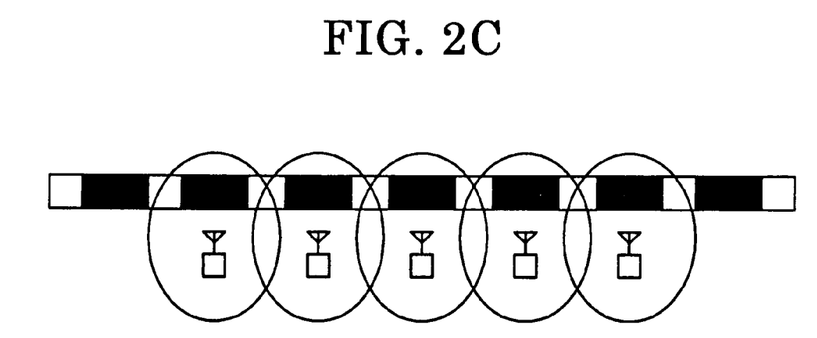

Now, an operation of a data processing unit for selecting a suitable radio wave at the time of moving among cells as shown in FIGS. 2(a) to 2(c) will be described.

In the wireless communication, the range of reach of a radio wave from a base station is called a zone, and a small zone is called a cell. By covering a broad area by dividing it into a plurality of cells, the same frequency radio wave can be used repeatedly in spaced apart cells. FIGS. 2(a) to 2(c) show cell arrangements in the wireless communication. The unit cell size varies depending on the cell installation place. For example, in a rural area having less shielding objects for the radio wave as shown in FIG. 2(a), the unit cell size can be large. On the other hand, in an urban area having more shielding objects as shown in FIG. 2(b), the unit cell size should be reduced, thereby providing more cells. Areas along a railway or a highway road as shown in FIG. 2(c), cells are arranged there along. With this arrangement, it is possible to maintain a stable communication even in case of communication with a moving data processing unit.

Figure 3:
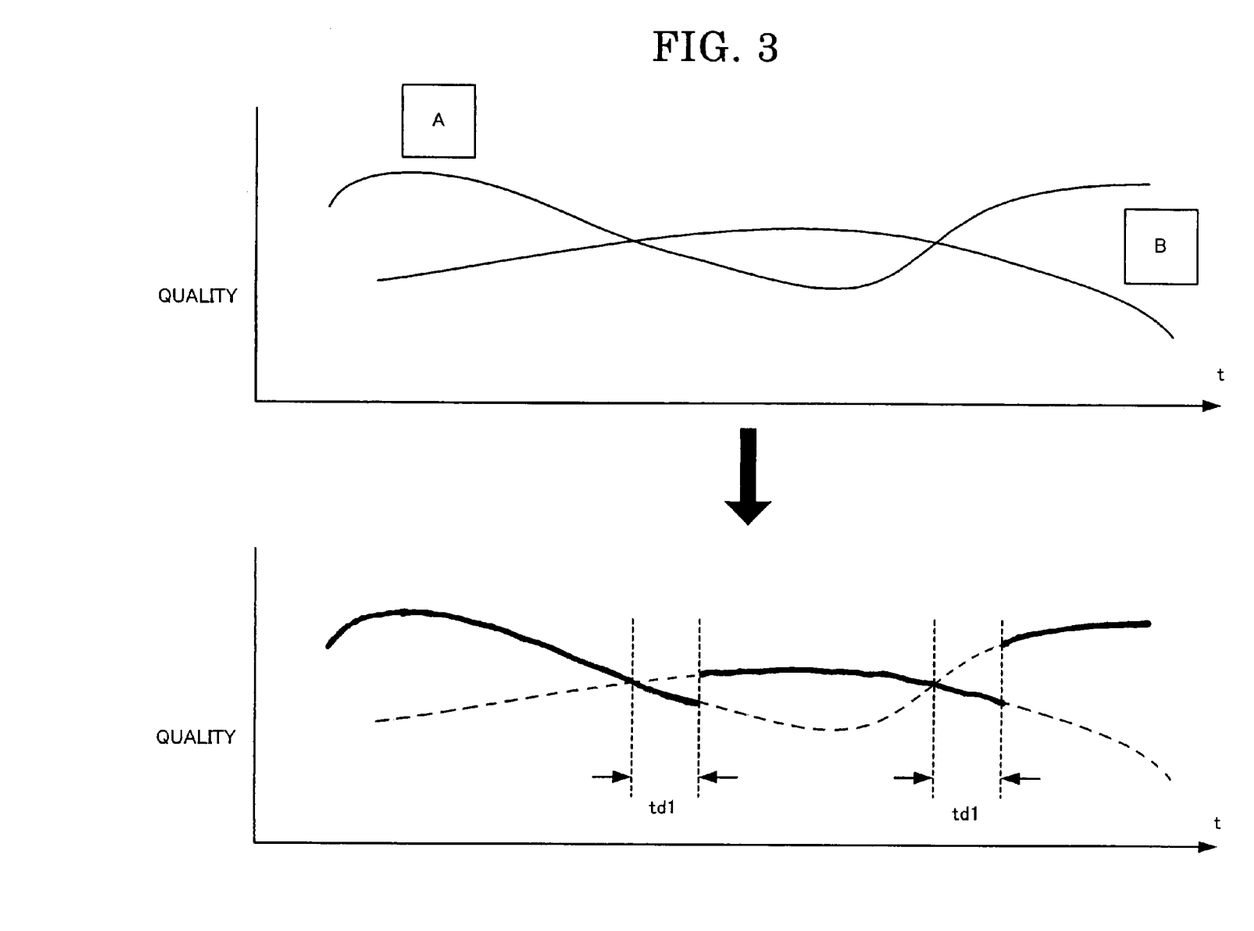
FIG. 3 is an illustration of a cell reselection operation.

Now, cell reselection of the data processing unit in the transition thereof to a waiting state, hand-over of the unit during communication and band search at the time of interruption of communication will be described with reference to FIGS. 3 to 5.

The reselection is an operation of selecting the optimum one of a plurality of radio waves when these radio waves are detected by the data processing unit in the transition thereof to a waiting state. The selection of a single received wave is made for reducing power consumed in the data processing unit. FIG. 3 illustrates the operation of selecting a good quality receiving wave in the cell reselection. In FIG. 3, the received wave shown by the solid curve is one selected by the data processing unit, and the received wave shown by the dashed curve is one not selected by the unit. Labeled td1 represents a monitoring time until selection of one of the received waves from the instant of conversion of the qualities of received waves A and B. The monitoring time td1 in the reselection process is a communication parameter in this embodiment. By the provision of the monitoring time in the received wave selection process, it is possible to prevent the switching of received waves due to transient received wave quality improvement and maintain a high quality received wave reception. However, the monitoring time td1 is extremely increased, in a place subject to great received wave quality changes, it is possible to result in failure of received wave reception in the monitoring time td1 and consequent interruption of communication. Thus, it is necessary to set as the monitoring time td1 a value, in which both the reliability and the follow-up property are taken into considerations.

Figure 4:
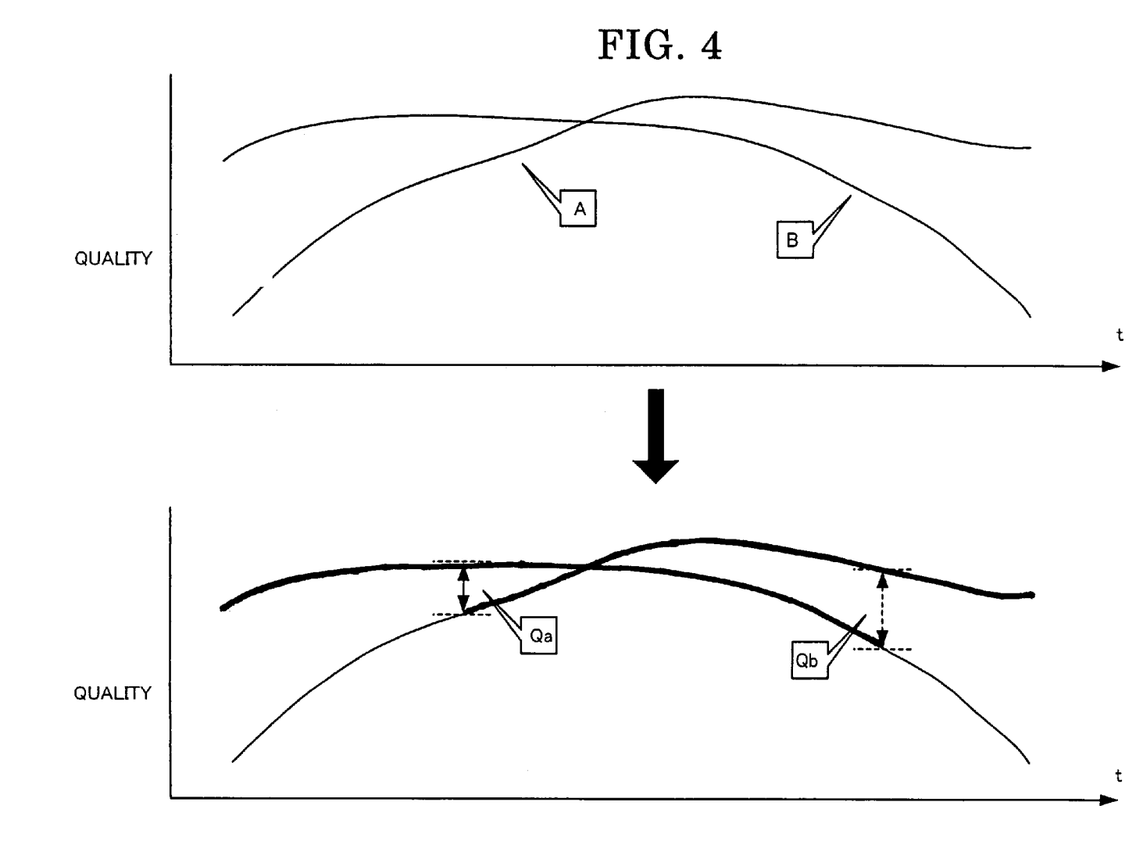
FIG. 4 is an illustration of a hand-over operation.

FIG. 4 illustrates the operation of received wave of good quality in the hand-over. When the data processing unit is in a waiting state, it communicates with a cell. The highest quality wave, with which the data processing unit communicates, is referred to as an active wave, and the second and following high quality waves are referred to as monitor waves. When the quality of a monitor wave becomes higher than the quality of the active wave, this monitor wave becomes the active wave. However, it can be thought that a monitor wave having transiently exceeded the active wave quality returned to the initial quality. In the hand-over, a monitoring time is provided, and when a monitor wave has been exceeding the active wave quality for a predetermined time, the active and monitor waves are switched over to each other.

Specifically, in the presence of two selectable waves as illustrated in FIG. 4, when the quality difference between the two waves is less than Qa, these waves are monitored as selectable received waves, and when the quality difference exceeds Qb, the selectable wave of the lower quality is detected. In this way, the quality of the received wave is maintained during communication. The quality differences Qa and Qb in the hand-over process are communication parameters in this embodiment. In the hand-over as illustrated in FIG. 4, no monitoring time is taken into considerations at the time of the received wave selection. However, it is possible to provide a monitoring time for the execution of the received wave monitoring and deletion. When setting Qa and Qb, it is possible to improve the reliability of the received wave selection by setting Qa to a small value and setting Qb to a large value. However, under conditions of hard received wave quality changes, such changes can not be followed up, making it impossible to execute the received wave monitoring and deletion. Thus, it is necessary to set Qa and Qb to values, in which both the reliability and the follow-up property are taken into considerations.

Figure 5:
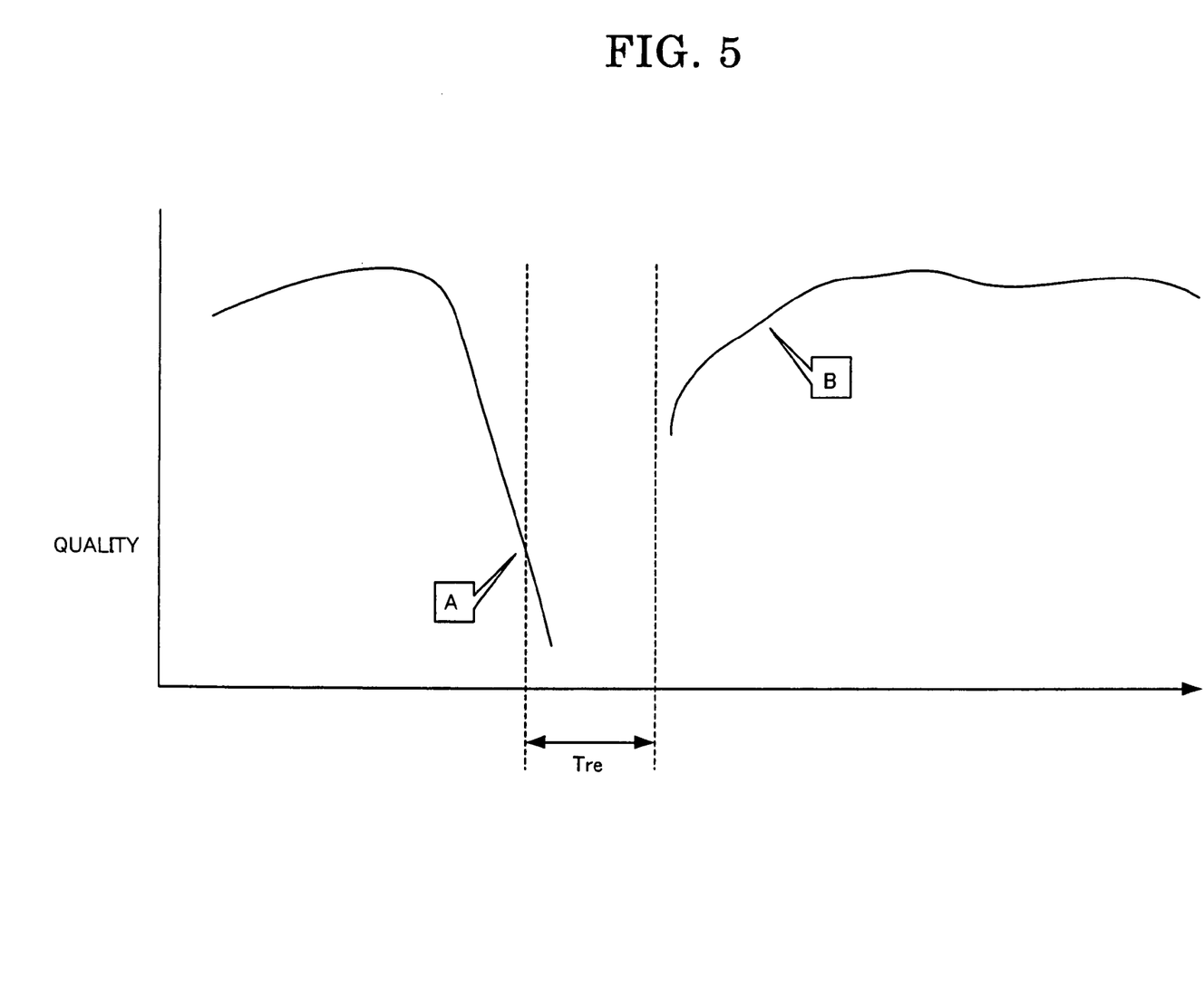
FIG. 5 is an illustration of a band research operation.

FIG. 5 illustrates the operation of restoring the communication in the band search. The band search is a process of receiving radio waves from the base station while changing the frequency when the power source of the data processing unit is turned on or when the communication is tentatively turned off. Specifically, when the communication is discontinued due to a great change in the quality of received wave A during communication, the received wave reception is executed again after the lapse of a communication discontinuation time Tre. The communication discontinuation time Tre in the band search process is a communication parameter in the embodiment. By increasing the communication discontinuation time Tre, the detection of the low quality received wave A afresh can be prevented. However, reducing the communication discontinuation time Tre has a merit of providing high convenience to the user. Thus, it is necessary to set Tre to a value, in which the reliability and the convenience are taken into consideration.

Figure 6:
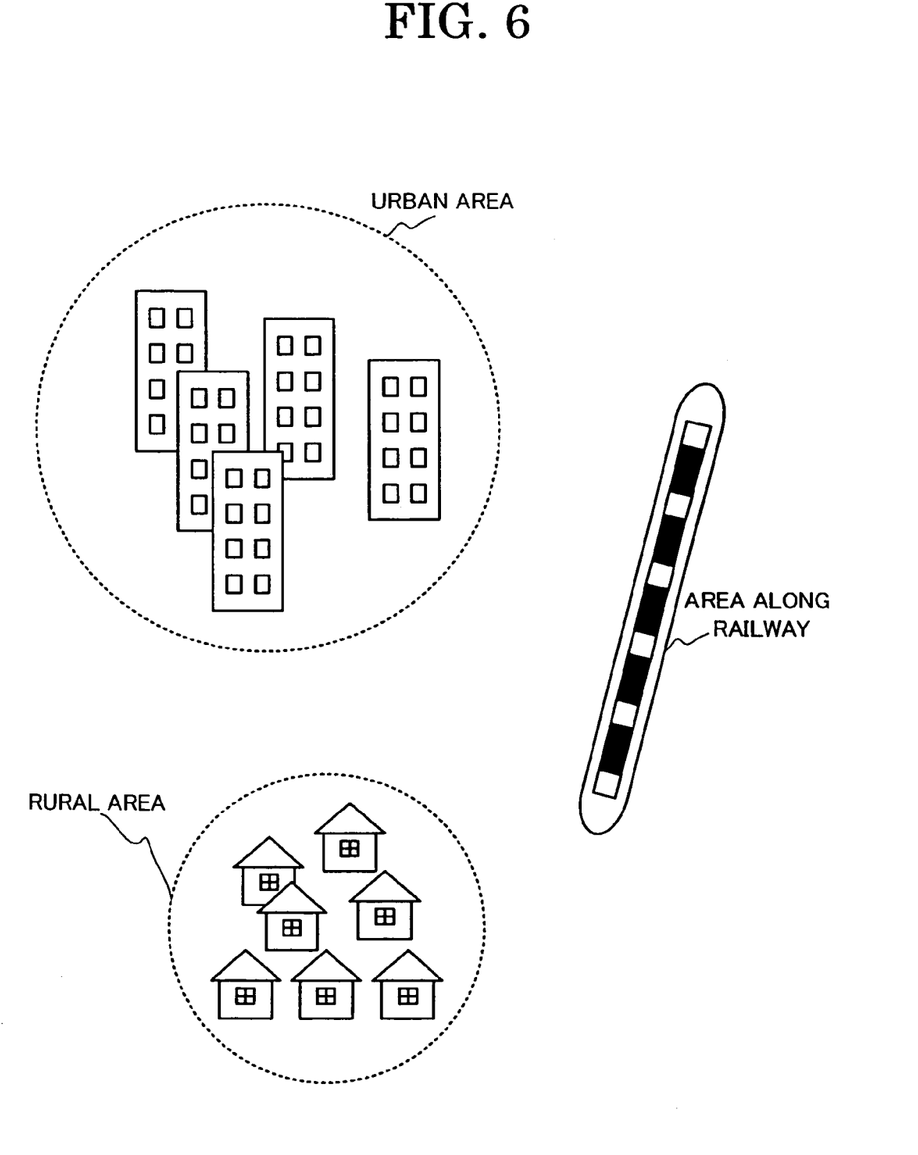
FIG. 6 is an illustration of the communication parameter setting for individual areas.

As has been shown, in order to maintain high quality communication with the unit to communicate, it is necessary to set communication parameter values depending on the conditions of the place of installation of the data processing unit. For example, as illustrated in FIG. 6, it is ideal to set the communication parameters depending on whether the installation place is an urban area, a rural area or an area along a railway or a road.

In this embodiment of the data processing unit, by utilizing the tuning function, the communication is always maintained with the optimum communication parameters under various conditions without conducting any test. The tuning function is one to store data representing the holding/non-holding of communication in the above cell reselection, hand-over and band search processes, judge from the stored data if the communication parameters in use are optimum, and set afresh the communication parameters when a predetermined judgment reference fails to be met. The embodiment of the data processing unit grasps the communication conditions with the other unit and confirms the communication condition by comparing the qualities of the transmitted and returned signals. For example, when a signal returned from the other communication unit has an error with respect to the transmitted signal, a decision is made that the present communication conditions are not good.

Figure 7:
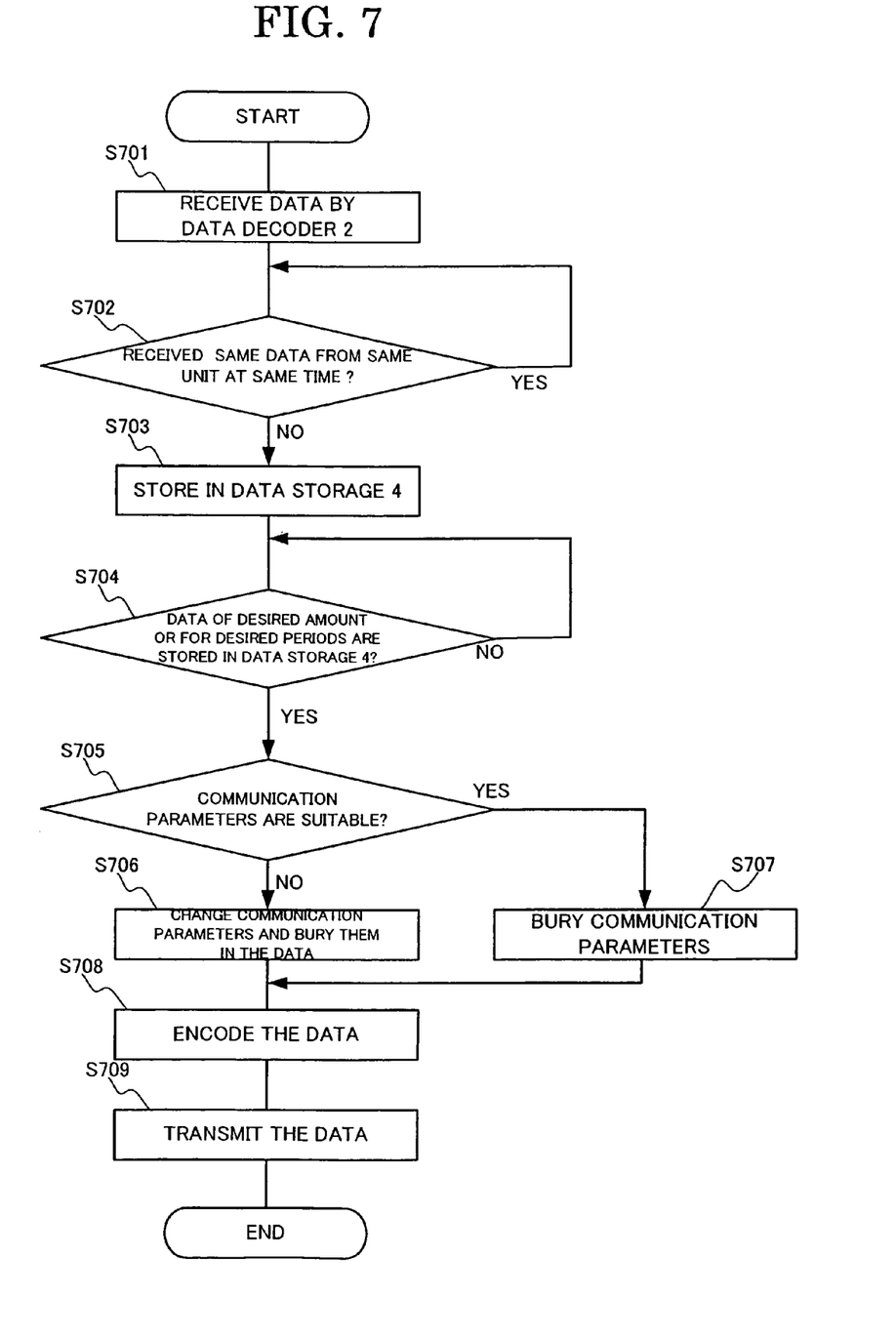
FIG. 7 is a flow chart to show the operation of a tuning function.

The specific operation of the tuning function of the embodiment of the data processing unit will now be described with reference to FIGS. 1(a) and 7. When the communication layer 1 detects data from the other communication unit, it receives the data by using the communication parameters presently set in the data decoder 2, decodes the data, and outputs the result to the data reliability checker 3 (step S701). The data reliability checker 3 checks out if the data have been received from the same communication unit at the same time (step S702). When the checker 3 determines that data has been received from the same communication unit at the same time (step S702/"YES"), the data are not stored in the data storage 4.

When the data reliability checker 3 determines that the data has not been received from the same communication unit at the same time (step S702/"NO"), the data are stored in the data storage 4 (step S703). The communication parameter checker 5 checks out in accordance with the stored data, i.e., if the communication parameters used for the data reception have been stored in the data storage 4 (step S704). The checker 5 checks out if the communication parameters used for the data reception are suitable (step S705). When the communication parameters are determined to be suitable (step 705/"YES"), the managing parameter controller 6 buries the communication parameters in the data (step S707). When the communication parameters are determined to be not suitable (step 705/"NO"), the managing parameter controller 6 changes the communication parameters and buries the changed values in the data (step S706).

Specifically, when the received wave switching success ratio is low in at least either one of the cell reselection, hand-over and band search accumulated in the data accumulator 4, the communication parameter checker 5 determines that the communication parameters are not suitable. The managing parameter controller 6 sets the communication parameters to be lower to improve the follow-up character of the received wave. By setting excessively low communication parameter values, the communication becomes unstable due to frequent received wave switching. Thus, it is necessary to set adequate values. When the received wave switching success radio is excessively high, the communication parameter checker 5 also determines that the communication parameters are not suitable. In this case, communication parameter controller 6 sets the communication parameters to higher values. When the communication parameter values are determined to be suitable, the communication parameter controller 6 does not change the communication parameter values.

The data encoder 7 encodes the data with the communication parameters buried in the data in the managing parameter controller 6 (step S708). The communication layer 1 transmits the coded data to the other communication unit (step S709).

What is claimed is:

1. A data processing unit for wirelessly communicating with a plurality of data processing units, comprising:
   transmitting means for transmitting data according to communication parameters;
   receiving means for receiving the data according to the communication parameters;
   checking means for checking out, according to the data, if the communication parameters are suited for a radio wave environment; and
   control means for setting the communication parameters to optimized values suitable for the radio wave environment;
   wherein the checking means checks out, when the data processing unit is in a waiting state and according to a cell selection resulted for achieving a best reception of a radio wave, if the communication parameters suitable for the radio wave environment have been set.

2. The data processing unit according to claim 1, wherein:
   the data processing unit further comprises storing means for storing the data received by the receiving means; and
   the checking means checks out, when a predetermined quantity of data has been stored in the storing means or when data in a predetermined period has been stored in the storing means, if the communication parameters suitable for the radio wave environment have been set.

3. The data processing unit according to claim 1, wherein one of the communication parameters is a monitoring time until the radio wave is switched to an optimum wave by a cell reselection.

4. The data processing unit according to claim 1, wherein the checking means checks out, while the data processing unit is in communication and according to a result of hand-over for an optimum radio wave selection, if the communication parameters suitable for the radio wave environment have been set.

5. The data processing unit according to claim 4, wherein one of the communication parameters is a difference between qualities of radio waves being compared in the hand-over.

6. The data processing unit according to claim 1, wherein the checking means checks out, according to a result of a circular redundancy check of the data, if the communication parameters suitable for the radio wave environment have been set.

7. The data processing unit according to claim 1, wherein the checking means checks out, according to a ratio between signal component and noise component in the data, if the communication parameters suitable for the radio wave environment have been set.

8. The data processing unit according to claim 1, wherein the checking means checks out, according to a reception level of signal synchronized with reception of the data, if the communication parameters suitable for the radio wave environment have been set.

9. The data processing unit according claim 1, wherein the checking means checks out, according to a speed of movement of the communication unit, if the communication parameters suitable for the radio wave environment have been set.

10. A data processing unit for wirelessly communicating with a plurality of data processing units, comprising:
    transmitting means for transmitting data according to communication parameters;
    receiving means for receiving the data according to the communication parameters;
    checking means for checking out, according to the data, if the communication parameters are suited for a radio wave environment; and
    control means for setting the communication parameters to optimized values suitable for the radio wave environment;
    wherein:
    the checking means checks out, when the data processing unit is in a waiting state and according to a cell selection resulted for achieving a best reception of a radio wave, if the communication parameters suitable for the radio wave environment have been set;
    the checking means checks out, when the communication of the data processing unit is discontinued or a power source of the data processing unit is turned on and according to a result of a band search for an optimum radio wave detection, if the communication parameters suitable for the radio wave environment have been set.

11. The data processing unit according to claim 10, wherein one of the communication parameters is a waiting time from a momentary discontinuation of the wireless communicating by band search till the the optimum radio wave detection is resulted.

12. A data processing method for wirelessly communicating with a plurality of data processing units, comprising the steps of:
    transmitting data according to communication parameters;
    receiving the data according to the communication parameters;
    controlling to set the communication parameters to optimized values suitable for the radio wave environment; and
    checking out, according to the data, when the data processing unit is in a waiting state and according to the result cell selection for achieving a best reception of a radio wave, if the communication parameters suitable for the radio wave environment have been set.

13. The data processing method according to claim 12, wherein:
    The data processing method further comprises storing the data received in the receiving step; and
    the checking means checks out, when a predetermined quantity of data has been stored in the storing means or when data in a predetermined period has been stored in the storing means, if the communication parameters suitable for the radio wave environment have been set.

14. The data processing method according to claim 12, wherein one of the communication parameters is a monitoring time until the radio wave is switched to an optimum wave by a cell reselection.

15. The data processing method according to claim 12, wherein the checking step checks out, while the data processing unit is in communication and according to a result of a hand-over for an optimum radio wave selection, if the communication parameters suitable for the radio wave environment have been set.

16. The data processing method according to claim 15, wherein one of the communication parameters is a difference between qualities of radio waves being compared in the hand-over.

17. The data processing method according to claim 12, wherein the checking step checks out, according to a result of a circular redundancy check of the data, if the communication parameters suitable for the radio wave environment have been set.

18. The data processing method according to claim 12, wherein the checking step checks out, according to a ratio between signal component and noise component in the data, if the communication parameters suitable for the radio wave environment have been set.

19. The data processing method according to claim 12, wherein the checking step checks out, according to a reception level of signal synchronized with reception of the data, if the communication parameters suitable for the radio wave environment have been set.

20. The data processing method according to claim 12, wherein the checking step checks out, according to a speed of movement of the communication unit, if the communication parameters suitable for the radio wave environment have been set.

21. A data processing method for wirelessly communicating with a plurality of data processing units, comprising:
transmitting data according to communication parameters;
receiving the data according to the communication parameters;
controlling to set the communication parameters to optimized values suitable for the radio wave environment; and
checking out, according to the data, when the data processing unit is in a waiting state and according to the result cell selection for achieving a best reception of a radio wave, if the communication parameters suitable for the radio wave environment have been set;
wherein the checking step checks out, when the communication of the data processing unit is discontinued or a power source of the data processing unit is turned on and according to a result of a band search for an optimum radio wave detection, if the communication parameters suitable for the radio wave environment have been set.

22. The data processing method according to claim 21, wherein one of the communication parameters is a waiting time from a momentary discontinuation of the wireless communicating by band search till the the optimum radio wave detection is resulted.

23. A data processing system for wirelessly communicating with a plurality of data processing units, wherein the data processing unit comprises:
transmitting means for transmitting data according to communication parameters;
receiving means for receiving the data according to the communication parameters;
checking means for checking out, according to the data, if the communication parameters are suited for a radio wave environment; and
control means for setting the communication parameters to optimized values suitable for the radio wave environment;
wherein the checking means checks out, when the data processing unit is in a waiting state and according to a cell selection resulted for achieving a best reception of a radio wave, if the communication parameters suitable for the radio wave environment have been set.

24. The data processing system according to claim 23, wherein:
the data processing unit further comprises storing means for storing the data received by the receiving means; and
the checking means checks out, when a predetermined quantity of data has been stored in the storing means or when data in a predetermined period has been stored in the storing means, if the communication parameters suitable for the radio wave environment have been set.

25. The data processing system according to claim 23, wherein one of the communication parameters is a monitoring time until the radio wave is switched to an optimum wave by a cell reselection.

26. The data processing system according claim 23, wherein the checking means checks out, while the data processing unit is in communication and according to a result of hand-over for an optimum radio wave selection, if the communication parameters suitable for the radio wave environment have been set.

27. The data processing system according to claim 26, wherein one of the communication parameters is a difference between qualities of radio waves being compared in the hand-over.

28. The data processing system according to claim 23, wherein the checking means checks out, according to a result of a circular redundancy check of the data, if the communication parameters suitable for the radio wave environment have been set.

29. The data processing system according to claim 23, wherein the checking means checks out, according to a ratio between signal component and noise component in the data, if the communication parameters suitable for the radio wave environment have been set.

30. The data processing system according to claim 23, wherein the checking means checks out, according to a reception level of signal synchronized with reception of the data, if the communication parameters suitable for the radio wave environment have been set.

31. The data processing system according to claim 23, wherein the checking means checks out, according to a speed of movement of the communication unit, if the communication parameters suitable for the radio wave environment have been set.

32. A data processing system for wirelessly communicating with a plurality of data processing units, wherein the data processing unit comprises:
transmitting means for transmitting data according to communication parameters;
receiving means for receiving the data according to the communication parameters;
checking means for checking out, according to the data, if the communication parameters are suited for a radio wave environment; and
control means for setting the communication parameters to optimized values suitable for the radio wave environment;
wherein:
the checking means checks out, when the data processing unit is in a waiting state and according to a cell selection resulted for achieving a best reception of a radio wave, if the communication parameters suitable for the radio wave environment have been set; and
the checking means checks out, when the communication of the data processing unit is discontinued or a power source of the data processing unit is turned on and according to a result of a band search for an optimum radio wave detection, if the communication parameters suitable for the radio wave environment have been set.

33. The data processing system according to claim 32, wherein one of the communication parameters is a waiting time from a momentary discontinuation of the wireless communicating by band search till the the optimum radio wave detection is resulted.

* * * * *